US006656862B1

(12) United States Patent
Krumwiede et al.

(10) Patent No.: US 6,656,862 B1
(45) Date of Patent: *Dec. 2, 2003

(54) BLUE PRIVACY GLASS

(75) Inventors: John F. Krumwiede, Cheswick, PA (US); Larry J. Shelestak, Bairdford, PA (US)

(73) Assignee: PPG Industries Ohio, Inc., Cleveland, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 296 days.

(21) Appl. No.: 09/076,566

(22) Filed: May 12, 1998

(51) Int. Cl.⁷ .......................... C03C 3/087; C03C 4/05; C03C 4/10
(52) U.S. Cl. ........................ 501/71; 501/904; 501/905
(58) Field of Search ........................ 501/71, 904, 905

(56) References Cited

U.S. PATENT DOCUMENTS

| | | | |
|---|---|---|---|
| 3,300,323 A | 1/1967 | Plumat et al. ................ 106/52 |
| 3,723,142 A | 3/1973 | Kato et al. .................... 106/52 |
| 4,104,076 A | 8/1978 | Pons .......................... 106/52 |
| 4,339,541 A | 7/1982 | Dela Rue .................... 501/71 |
| 4,381,934 A | 5/1983 | Kunkle et al. ................ 65/135 |
| 4,792,536 A | 12/1988 | Pecoraro et al. .............. 501/70 |
| 4,873,206 A | 10/1989 | Jones ......................... 501/71 |
| 4,886,539 A | 12/1989 | Cerutti et al. ................ 65/135 |
| 5,023,210 A | 6/1991 | Krumwiede et al. ......... 501/71 |
| 5,214,008 A * | 5/1993 | Beckwith et al. ............. 501/70 |
| 5,278,108 A | 1/1994 | Cheng et al. ................. 501/71 |
| 5,308,805 A | 5/1994 | Baker et al. .................. 501/71 |
| 5,346,867 A | 9/1994 | Jones et al. .................. 501/71 |
| 5,352,640 A | 10/1994 | Combes et al. ............... 501/71 |
| 5,380,685 A | 1/1995 | Morimoto .................... 501/71 |
| 5,393,593 A | 2/1995 | Gulotta et al. ............. 428/220 |
| 5,411,922 A | 5/1995 | Jones ......................... 501/71 |
| 5,478,783 A | 12/1995 | Higby et al. ................. 501/27 |
| 5,521,128 A | 5/1996 | Jones et al. .................. 501/27 |
| 5,545,596 A | 8/1996 | Casariego et al. .......... 501/741 |
| 5,582,455 A | 12/1996 | Casariego et al. ....... 296/146.2 |
| 5,688,727 A * | 11/1997 | Shelestak et al. ............. 501/71 |
| 5,780,372 A * | 7/1998 | Higby ........................ 501/71 |
| 5,807,417 A * | 9/1998 | Boulos et al. ................ 501/71 |
| 5,837,629 A | 11/1998 | Combes et al. ............... 501/70 |
| 5,851,940 A | 12/1998 | Boulos et al. ................ 501/71 |
| 5,994,249 A * | 11/1999 | Graber et al. |

FOREIGN PATENT DOCUMENTS

| | | |
|---|---|---|
| CA | 2148954 | 11/1992 |
| EP | 0 452 207 | 10/1991 |
| EP | 0 482 535 | 4/1992 |
| EP | 0 536 049 | 4/1993 |
| EP | 0 705 800 | 4/1995 |
| EP | 653338 A1 * | 5/1995 |
| EP | 0 677 492 | 10/1995 |
| EP | 0 705 800 | 4/1996 |
| EP | 0 768 284 | 4/1997 |
| EP | 0 887 320 | 12/1998 |
| FR | 2 331 527 | 7/1977 |
| GB | 1 331 492 | 9/1973 |
| GB | 2304709 | 3/1997 |
| GB | 2304711 | 3/1997 |
| JP | 6-503300 | 4/1994 |
| JP | 7-508971 | 10/1995 |
| JP | 8-165136 | 6/1996 |
| JP | 9-124341 | 5/1997 |
| WO | WO93/07095 | 7/1993 |
| WO | WO94/18135 | 8/1994 |
| WO | WO95/16641 | 6/1995 |
| WO | WO95/18075 | 7/1995 |
| WO | WO 96/00194 | 1/1996 |
| WO | 96/00194 | 1/1996 |
| WO | WO 97/17303 | 5/1997 |

\* cited by examiner

*Primary Examiner*—Michael Marcheschi
(74) *Attorney, Agent, or Firm*—Kenneth J. Stachel; Andrew C. Siminerio

(57) ABSTRACT

The present invention provides a blue colored, infrared and ultraviolet absorbing glass composition having a luminous transmittance of up to 60 percent. The glass uses a standard soda-lime-silica glass base composition and additionally iron and cobalt, and optionally selenium and/or titanium, as infrared and ultraviolet radiation absorbing materials and colorants. The glass of the present invention has a color characterized by a dominant wavelength in the range of 480 to 489 nanometers and an excitation purity of at least 8 percent at a thickness of 0.160 inches (4.06 millimeters). In one embodiment of the invention, the glass composition of a blue colored, infrared and ultraviolet radiation absorbing soda-lime-silica glass article includes a solar radiation absorbing and colorant portion consisting essentially of 0.9 to 2.0 percent by weight total iron, 0.15 to 0.65 percent by weight FeO, 90 to 250 PPM CoO, and optionally up to 12 PPM Se and up to 0.9 wt % $TiO_2$, and preferably 1 to 1.4 percent by weight total iron, 0.20 to 0.50 percent by weight FeO, 100 to 150 PPM CoO, up to 8 PPM Se, and up to 0.5 wt % $TiO_2$.

50 Claims, No Drawings

BLUE PRIVACY GLASS

BACKGROUND OF THE INVENTION

1. Field of the Invention

This invention relates to a blue colored soda-lime-silica glass having a low luminous transmittance that makes it desirable for use as a privacy glazing in vehicles, such as the side and rear windows in vans or sun roofs for automotive vehicles. As used herein, the term "blue colored" is meant to include glasses that have a dominant wavelength of 480 to 489 nanometers (nm) and may also be characterized as blue-green or blue-gray in color. In addition, the glass should exhibit lower infrared and ultraviolet radiation transmittance when compared to typical blue glasses used in automotive applications and be compatible with float glass manufacturing methods.

2. Technical Considerations and Prior Art

Various dark tinted, infrared and ultraviolet radiation absorbing glass compositions are known in the art. The primary colorant in typical dark tinted automotive privacy glasses is iron, which is usually present in both the $Fe_2O_3$ and FeO forms. Some glasses use cobalt, selenium and, optionally, nickel in combination with iron to achieve a desired color and infrared and ultraviolet radiation, for example, as disclosed in U.S. Pat. No. 4,873,206 to Jones; U.S. Pat. No. 5,278,108 to Cheng, et al.; U.S. Pat. No. 5,308,805 to Baker, et al.; U.S. Pat. No. 5,393,593 to Gulotta, et al.; U.S. Pat. Nos. 5,545,596 and 5,582,455 to Casariego, et al.; and European Patent Application No. 0 705 800. Others also include chromium with this combination of colorants as disclosed in U.S. Pat. No. 4,104,076 to Pons; U.S. Pat. No. 4,339,541 to Dela Ruye; U.S. Pat. No. 5,023,210 to Krumwiede, et al.; and U.S. Pat. No. 5,352,640 to Combes, et al.; European Patent Application No. 0 536 049; French Patent No. 2,331,527 and Canadian Patent No. 2,148,954. Patents such as U.S. Pat. Nos. 5,521,128 and 5,346,867 to Jones, et al. and U.S. Pat. No. 5,411,922 to Jones further includes manganese and/or titanium. Still, other glasses may include additional materials, such as disclosed in WO 96/00194, which teaches the inclusion of fluorine, zirconium, zinc, cerium, titanium and copper in the glass composition and requires that the sum of the alkaline earth oxides be less than 10 weight percent of the glass.

One particular blue composition that provides superior spectral performance is disclosed in U.S. Pat. No. 4,792,536 to Pecoraro, et al. Commercial products which incorporate this patent are sold by PPG Industries, Inc. under the trademarks SOLEXTRA® and AZURLITE®. This glass has a dominant wavelength ranging from about 486 to 489 nm and excitation purity ranges from about 8 to 14 percent. It would be advantageous to be able to produce a dark tinted blue colored glass to complement this blue colored glass using conventional glass melting processing techniques.

SUMMARY OF THE INVENTION

The present invention provides a blue colored, infrared and ultraviolet absorbing glass composition having a luminous transmittance of up to 60 percent. The glass uses a standard soda-lime-silica glass base composition and additionally iron and cobalt, and optionally selenium and/or titanium, as infrared and ultraviolet radiation absorbing materials and colorants. The glass of the present invention has a color characterized by a dominant wavelength in the range of 480 to 489 nanometers and an excitation purity of at least 8 percent at a thickness of 0.160 inches (4.06 millimeters).

In one embodiment of the invention, the glass composition of a blue colored, infrared and ultraviolet radiation absorbing soda-lime-silica glass article includes a solar radiation absorbing and colorant portion consisting essentially of 0.9 to 2.0 percent by weight total iron, 0.15 to 0.65 percent by weight FeO, 90 to 250 PPM CoO, and optionally up to 12 PPM Se and up to 0.9 wt % $TiO_2$, and preferably 1 to 1.4 percent by weight total iron, 0.20 to 0.50 percent by weight FeO, 100 to 150 PPM CoO, up to 8 PPM Se, and up to 0.5 wt % $TiO_2$.

DETAILED DESCRIPTION OF THE INVENTION

The base glass of the present invention, that is, the major constituents of the glass without infrared or ultraviolet absorbing materials and/or colorants, which are an object of the present invention, is commercial soda-lime-silica glass typically characterized as follows:

|  | Weight Percent |
| --- | --- |
| $SiO_2$ | 66 to 75 |
| $Na_2O$ | 10 to 20 |
| CaO | 5 to 15 |
| MgO | 0 to 5 |
| $Al_2O_3$ | 0 to 5 |
| $K_2O$ | 0 to 5 |

As used herein, all "weight percent (wt %)" values are based on the total weight of the final glass composition.

To this base glass, the present invention adds infrared and ultraviolet radiation absorbing materials and colorants in the form of iron and cobalt and optionally selenium and/or titanium. As disclosed herein with respect to the glass compositions, iron is expressed in terms of $Fe_2O_3$ and FeO, cobalt is expressed in terms of CoO, selenium is expressed in terms of elemental Se and titanium is expressed in terms of $TiO_2$. It should be appreciated that the glass compositions disclosed herein may include small amounts of other materials, for example, melting and refining aids, tramp materials or impurities. It should be further appreciated that in one embodiment of the invention, small amounts of additional materials may be included in the glass to provide the desired color characteristics and improve the solar performance of the glass, as will be discussed later in more detail.

The iron oxides in a glass composition perform several functions. Ferric oxide, $Fe_2O_3$, is a strong ultraviolet radiation absorber and operates as a yellow colorant in the glass. Ferrous oxide, FeO, is a strong infrared radiation absorber and operates as a blue colorant. The total amount of iron present in the glasses disclosed herein is expressed in terms of $Fe_2O_3$ in accordance with standard analytical practice but that does not imply that all of the iron is actually in the form of $Fe_2O_3$. Likewise, the amount of iron in the ferrous state is reported as FeO even though it may not actually be present in the glass as FeO. In order to reflect the relative amounts of ferrous and ferric iron in the glass compositions disclosed herein, the term "redox" shall mean the amount of iron in the ferrous state (expressed as FeO) divided by the amount of total iron (expressed as $Fe_2O_3$). Furthermore, unless stated otherwise, the term "total iron" in this specification shall mean total iron expressed in terms of $Fe_2O_3$ and the term "FeO" shall mean iron in the ferrous state expressed in terms of FeO.

CoO operates as a blue colorant and does not exhibit any appreciable infrared or ultraviolet radiation absorbing properties. Se is an ultraviolet absorbing colorant that imparts a pink or brown color to soda-lime-silica glass. Se may also absorb some infrared radiation and its use tends to reduce redox. $TiO_2$ is an ultraviolet radiation absorber that operates as a colorant imparting a yellow color to the glass composition. A proper balance between the iron, i.e. ferric and ferrous oxides and cobalt, and optionally selenium and/or titanium is required to obtain the desired blue colored privacy glass with the desired spectral properties.

The glass of the present invention may be melted and refined in a continuous, large-scale, commercial glass melting operation and formed into flat glass sheets of varying thickness by the float process in which the molten glass is supported on a pool of molten metal, usually tin, as it assumes a ribbon shape and is cooled, in a manner well known in the art.

Although it is preferred that the glass disclosed herein be made using a conventional, overhead fired continuous melting operation, as is well known in the art, the glass may also be produced using a multi-stage melting operation, as disclosed in U.S. Pat. No. 4,381,934 to Kunkle, et al., U.S. Pat. No. 4,792,536 to Pecoraro, et al. and U.S. Pat. No. 4,886,539 to Cerutti, et al. If required, a stirring arrangement may be employed within the melting and/or forming stages of the glass production operation to homogenize the glass in order to produce glass of the highest optical quality.

Depending on the type of melting operation, sulfur may be added to the batch materials of a soda-lime-silica glass as a melting and refining aid. Commercially produced float glass may include up to about 0.3 wt % $SO_3$. In a glass composition that includes iron and sulfur, providing reducing conditions may create amber coloration which lowers luminous transmittance as discussed in U.S. Pat. No. 4,792,536 to Pecoraro, et al. However, it is believed that the reducing conditions required to produce this coloration in float glass compositions of the type disclosed herein are limited to approximately the first 20 microns of the lower glass surface contacting the molten tin during the float forming operation, and to a lesser extent, to the exposed upper glass surface. Because of the glass low sulfur content and the limited region of the glass in which any coloration could occur, depending on the particular soda-lime-silica-glass composition, sulfur in these surfaces essentially has no material effect on the glass color or spectral properties.

It should be appreciated that as a result of forming the glass on molten tin as discussed above, measurable amounts of tin oxide may migrate into surface portions of the glass on the side contacting the molten tin. Typically, a piece of float glass has an $SnO_2$ concentration ranging from about 0.05 to 2 wt % in about the first 25 microns below the surface of the glass that was in contact with the tin. Typical background levels of $SnO_2$ may be as high as 30 parts per million (PPM). It is believed that high tin concentrations in about the first 10 angstroms of the glass surface supported by the molten tin may slightly increase the reflectivity of that glass surface; however, the overall impact on the glass properties is minimal.

Table 1 illustrates examples of experimental glass melts having glass compositions which embody the principles of the present invention. Similarly, Table 2 illustrates a series of computer modeled glass compositions embodying the principles of the present invention. The modeled compositions were generated by a glass color and spectral performance computer model developed by PPG Industries, Inc. Tables 1 and 2 list only the iron, cobalt, selenium and titanium portions of the examples. Analysis of selected experimental melts in Table 1 indicates that it is expected that the melts would most likely include up to about 10 PPM $Cr_2O_3$ and up to about 39 PPM $MnO_2$. Examples 5–19 also included up to about 0.032 weight percent $TiO_2$. It is presumed that the $Cr_2O_3$, $MnO_2$ and $TiO_2$ entered the glass melts as part of the cullet. In addition, the modeled compositions were modeled to include 7 PPM $Cr_2O_3$. It is believed that glass compositions of the instant invention produced by a commercial float process as discussed earlier may include low levels of $Cr_2O_3$ and $MnO_2$ and less than 0.020 weight percent $TiO_2$, but these levels of such materials are considered to be tramps levels which would not materially affect the color characteristics and spectral properties of the blue glass of the present invention.

The spectral properties shown for Tables 1 and 2 are based on a reference thickness of 0.160 inches (4.06 mm). It should be appreciated that the spectral properties of the examples may be approximated at different thicknesses using the formulas disclosed in U.S. Pat. No. 4,792,536.

With respect to the transmittance data provided in Table 1, the luminous transmittance (LTA) is measured using C.I.E. standard illuminant "A" with a 2° observer over the wavelength range of 380 to 770 nanometers. Glass color, in terms of dominant wavelength and excitation purity, is measured using C.I.E. standard illuminant "C" with a 2° observer, following the procedures established in ASTM E308-90 . The total solar ultraviolet transmittance (TSUV) is measured over the wavelength range of 300 to 400 nanometers, total solar infrared transmittance (TSIR) is measured over the wavelength range of 720 to 2000 nanometers, and total solar energy transmittance (TSET) is measured over the wavelength range of 300 to 2000 nanometers. The TSUV, TSIR and TSET transmittance data are calculated using Parry Moon air mass 2.0 direct solar irradiance data and integrated using the Trapezoidal Rule, as is known in the art. The spectral properties presented in Table 2 are based on the same wavelength ranges and calculation procedures.

Sample Preparation

The information provided for Examples 1–4 in Table 1 is based on experimental laboratory melts having approximately the following batch components:

|  | Ex. 1–3 | Ex. 4 |
| --- | --- | --- |
| cullet A | 3000 gm | 2850 gm |
| cullet B | — | 150 gm |
| $TiO_2$ | 6 gm | 6 gm |

Cullet A included about 1.097 wt % total iron, 108 PPM CoO, 12 PPM Se and 7 PPM $Cr_2O_3$. Cullet B included about 0.385 wt % total iron, 67 PPM CoO, 12 PPM Se and 8 PPM $Cr_2O_3$. In preparing the melts, the ingredients were weighed out, mixed, placed in a platinum crucible and heated to 2650° F. (1454° C.) for 2 hours. Next, the molten glass was fritted in water, dried and reheated to 2650° F. (1454° C.) in a platinum crucible for 1 hour. The molten glass was then fritted a second time in water, dried and reheated to 2650°

F. (1454° C.) in a platinum crucible for 2 hours. The molten glass was then poured out of the crucible to form a slab and annealed. Samples were cut from the slab and ground and polished for analysis.

The information provided for Examples 5–19 in Table 1 is based on experimental laboratory melts having approximately the following batch components:

| | |
|---|---|
| cullet | 239.74 gm |
| sand | 331.10 gm |
| soda ash | 108.27 gm |
| limestone | 28.14 gm |
| dolomite | 79.80 gm |
| salt cake | 2.32 gm |
| $Fe_2O_3$ (total iron) | as required |
| $Co_3O_4$ | as required |
| Se | as required |
| $TiO_2$ | as required |

The raw materials were adjusted to produce a final glass weight of 700 grams. Reducing agents were added as required to control redox. The cullet used in the melts (which formed approximately 30% of the melt) included up to 0.51 wt % total iron, 0.055 wt % $TiO_2$ and 7 PPM $Cr_2O_3$. In preparing the melts, the ingredients were weighed out and mixed. A portion of the raw batch material was then placed in a silica crucible and heated to 2450° F. (1343° C.). When the batch material melted down, the remaining raw materials were added to the crucible and the crucible was held at 2450° F. (1343° C.) for 30 minutes. The molten batch was then heated and held at temperatures of 2500° F. (1371° C.), 2550° F. (1399° C.), 2600° F. (1427° C.) for 30 minutes, 30 minutes and 1 hour, respectively. Next, the molten glass was fritted in water, dried and reheated to 2650° F. (1454° C.) in a platinum crucible for two hours. The molten glass was then poured out of the crucible to form a slab and annealed. Samples were cut from the slab and ground and polished for analysis.

The chemical analysis of the glass compositions (except for FeO) was determined using a RIGAKU 3370 X-ray fluorescence spectrophotometer. The spectral characteristics of the glass were determined on annealed samples using a Perkin-Elmer Lambda 9 UV/VIS/NIR spectrophotometer prior to tempering the glass or prolonged exposure to ultraviolet radiation, which will effect the spectral properties of the glass. The FeO content and redox were determined using the glass color and spectral performance computer model developed by PPG Industries, Inc.

The following is the approximate basic oxides of the experimental melts disclosed in Table 1:

| | Ex. 1–3 | Ex. 4 | Ex. 5–19 |
|---|---|---|---|
| $SiO_2$ (wt %) | 66.1 | 66.8 | 72.4 |
| $Na_2O$ (wt %) | 17.8 | 17.4 | 13.5 |
| CaO (wt %) | 7.8 | 7.9 | 8.7 |
| MgO (wt %) | 3.1 | 3.1 | 3.7 |
| $Al_2O_3$ (wt %) | 3.1 | 2.8 | 0.17 |
| $K_2O$ (wt %) | 0.70 | 0.63 | 0.049 |

It is expected that the basic oxide constituents of commercial soda-lime-silica glass compositions based on the experimental melts disclosed in Table 1 and the modeled compositions disclosed in Table 2 would fall within the ranges of the glass constituents as discussed earlier.

TABLE 1

| | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|
| Total iron (wt %) | 1.110 | 1.116 | 1.117 | 1.044 | 1.233 | 1.230 | 1.237 | 1.238 | 1.236 | 1.232 |
| FeO (wt %) | 0.389 | 0.386 | 0.394 | 0.379 | 0.317 | 0.316 | 0.329 | 0.317 | 0.304 | 0.320 |
| Model redox | 0.350 | 0.346 | 0.353 | 0.362 | 0.257 | 0.257 | 0.266 | 0.256 | 0.246 | 0.260 |
| CoO (PPM) | 134 | 129 | 131 | 128 | 126 | 128 | 127 | 126 | 116 | 126 |
| Se (PPM) | 11 | 10 | 11 | 11 | 6 | 7 | 5 | 6 | 8 | 6 |
| $TiO_2$ (wt %) | 0.199 | 0.188 | 0.188 | 0.173 | 0.020 | 0.021 | 0.020 | 0.021 | 0.022 | 0.020 |
| LTA (%) | 28.1 | 28.8 | 29.5 | 29.6 | 35.1 | 35.2 | 35.4 | 35.4 | 35.7 | 35.8 |
| TSUV (%) | 16.6 | 17.0 | 18.1 | 19.1 | 21.7 | 21.4 | 22.0 | 21.6 | 20.4 | 22.12 |
| TSIR (%) | 9.2 | 9.2 | 8.9 | 9.7 | 12.7 | 13.9 | 11.9 | 12.7 | 13.7 | 12.4 |
| TSET (%) | 18.0 | 18.4 | 18.6 | 19.1 | 24.5 | 25.2 | 24.3 | 24.7 | 25.1 | 24.8 |
| DW (nm) | 488.6 | 488.5 | 487.7 | 488.0 | 484.9 | 485.1 | 484.7 | 485.0 | 487.0 | 484.7 |
| Pe (%) | 9.8 | 10.0 | 11.1 | 9.5 | 13.0 | 12.0 | 14.4 | 13.2 | 8.9 | 13.7 |

| | Ex. 11 | Ex. 12 | Ex. 13 | Ex. 14 | Ex. 15 | Ex. 16 | Ex. 17 | Ex. 18 | Ex. 19 |
|---|---|---|---|---|---|---|---|---|---|
| Total iron (wt %) | 1.234 | 1.225 | 1.226 | 1.204 | 1.212 | 1.217 | 1.208 | 1.213 | 1.204 |
| FeO (wt %) | 0.313 | 0.296 | 0.318 | 0.384 | 0.325 | 0.323 | 0.315 | 0.312 | 0.307 |
| Model redox | 0.254 | 0.242 | 0.259 | 0.319 | 0.268 | 0.265 | 0.261 | 0.257 | 0.255 |
| CoO (PPM) | 126 | 124 | 126 | 91 | 93 | 92 | 94 | 94 | 90 |
| Se (PPM) | 5 | 6 | 6 | 0 | 0 | 0 | 0 | 0 | 0 |
| $TiO_2$ (wt %) | 0.022 | 0.019 | 0.020 | 0.024 | 0.029 | 0.032 | 0.032 | 0.032 | 0.028 |
| LTA (%) | 36.2 | 36.3 | 36.4 | 44.7 | 45.4 | 45.4 | 45.5 | 45.6 | 46.7 |
| TSUV (%) | 22.3 | 21.7 | 22.5 | 29.3 | 27.7 | 27.4 | 27.3 | 27.2 | 27.8 |
| TSIR (%) | 12.9 | 14.3 | 12.7 | 8.5 | 11.9 | 12.3 | 12.8 | 13.0 | 13.3 |
| TSET (%) | 25.2 | 26.0 | 25.2 | 26.9 | 29.0 | 29.1 | 29.5 | 29.7 | 30.3 |
| DW (nm) | 484.7 | 485.0 | 484.6 | 484.8 | 484.9 | 484.9 | 484.9 | 484.9 | 485.2 |
| Pe (%) | 13.8 | 12.8 | 14.3 | 18.0 | 17.0 | 16.9 | 16.5 | 16.7 | 16.1 |

TABLE 2

|  | Ex. 20 | Ex. 21 | Ex. 22 | Ex. 23 | Ex. 24 | Ex. 25 | Ex. 26 | Ex. 27 | Ex. 28 |
| --- | --- | --- | --- | --- | --- | --- | --- | --- | --- |
| Total iron (wt %) | 1.8 | 1.8 | 1.6 | 1.45 | 1.3 | 0.975 | 1.1 | 1.1 | 1.1 |
| FeO (wt %) | 0.63 | 0.63 | 0.56 | 0.51 | 0.46 | 0.23 | 0.17 | 0.17 | 0.33 |
| Model redox | 0.35 | 0.35 | 0.35 | 0.35 | 0.35 | 0.24 | 0.15 | 0.15 | 0.3 |
| CoO (PPM) | 200 | 200 | 175 | 150 | 140 | 190 | 200 | 200 | 110 |
| Se (PPM) | 0 | 0 | 0 | 0 | 0 | 0 | 0 | 0 | 10 |
| $TiO_2$ (wt %) | 0.6 | 0 | 0.6 | 0.6 | 0.4 | 0.1 | 0.05 | 0 | 0.02 |
| LTA (%) | 23.9 | 24.8 | 27.8 | 31.8 | 34.9 | 35.0 | 35.0 | 35.1 | 35.5 |
| TSUV (%) | 17.4 | 21.5 | 19.7 | 21.7 | 25.5 | 30.8 | 25.4 | 25.9 | 24.2 |
| TSIR (%) | 2.7 | 2.7 | 2.8 | 4.9 | 6.5 | 21.8 | 32.7 | 32.7 | 12.7 |
| TSET (%) | 14.1 | 15.2 | 16.3 | 18.6 | 21.1 | 30.7 | 36.0 | 36.1 | 23.6 |
| DW (nm) | 482.1 | 481.1 | 482.7 | 483.4 | 483.0 | 480.1 | 480.6 | 480.5 | 485.2 |
| Pe (%) | 34.5 | 38.4 | 30.5 | 26.6 | 25.9 | 27.9 | 24.8 | 25.2 | 9.9 |

|  | Ex. 29 | Ex. 30 | Ex. 31 | Ex. 32 | Ex. 33 | Ex. 34 | Ex. 35 | Ex. 36 | Ex. 37 |
| --- | --- | --- | --- | --- | --- | --- | --- | --- | --- |
| Total iron (wt %) | 1.0 | 1.45 | 1.1 | 1.2 | 1.1 | 1.6 | 1.3 | 1.8 | 1.1 |
| FeO (wt %) | 0.22 | 0.32 | 0.31 | 0.31 | 0.39 | 0.35 | 0.29 | 0.40 | 0.24 |
| Model redox | 0.22 | 0.22 | 0.28 | 0.26 | 0.35 | 0.22 | 0.22 | 0.22 | 0.22 |
| CoO (PPM) | 175 | 140 | 110 | 150 | 95 | 140 | 140 | 110 | 140 |
| Se (PPM) | 1 | 3 | 10 | 1 | 10 | 1 | 3 | 1 | 3 |
| $TiO_2$ (wt %) | 0.4 | 0.02 | 0.02 | 0.6 | 0.02 | 0.02 | 0.02 | 0.02 | 0.02 |
| LTA (%) | 35.9 | 35.9 | 36.0 | 36.0 | 36.1 | 36.1 | 37.1 | 38.5 | 38.9 |
| TSUV (%) | 25.8 | 20.0 | 23.6 | 21.8 | 25.9 | 18.8 | 22.4 | 16.3 | 26.1 |
| TSIR (%) | 23.7 | 13.5 | 14.4 | 14.1 | 9.4 | 11.3 | 16.3 | 8.9 | 20.9 |
| TSET (%) | 31.1 | 24.6 | 24.6 | 25.2 | 22.0 | 23.5 | 26.9 | 22.5 | 30.5 |
| DW (nm) | 481.5 | 485.0 | 485.7 | 484.0 | 485.5 | 485.3 | 484.1 | 488.6 | 482.9 |
| Pe (%) | 21.7 | 17.3 | 8.7 | 19.0 | 10.6 | 19.4 | 17.3 | 15.4 | 17.4 |

|  | Ex. 38 | Ex. 39 | Ex. 40 | Ex. 41 | Ex. 42 | Ex. 43 | Ex. 44 |
| --- | --- | --- | --- | --- | --- | --- | --- |
| Total iron (wt %) | 1.1 | 1.1 | 1.1 | 1.0 | 1.0 | 1.0 | 1.0 |
| FeO (wt %) | 0.28 | 0.31 | 0.28 | 0.22 | 0.22 | 0.22 | 0.25 |
| Model redox | 0.25 | 0.28 | 0.25 | 0.22 | 0.22 | 0.22 | 0.25 |
| CoO (PPM) | 140 | 130 | 110 | 120 | 110 | 95 | 90 |
| Se (PPM) | 0 | 0 | 0 | 0 | 0 | 0 | 0 |
| $TiO_2$ (wt %) | 0 | 0.1 | 0 | 0.05 | 0.02 | 0.02 | 0 |
| LTA (%) | 40.6 | 41.0 | 45.3 | 45.6 | 47.4 | 50.1 | 50.1 |
| TSUV (%) | 29.6 | 29.6 | 30.0 | 30.3 | 30.7 | 30.7 | 32.1 |
| TSIR (%) | 17.4 | 14.4 | 17.4 | 23.8 | 23.9 | 23.9 | 20.1 |
| TSET (%) | 30.0 | 28.4 | 31.5 | 35.3 | 36.0 | 36.9 | 34.9 |
| DW (nm) | 482.4 | 482.8 | 484.0 | 483.4 | 483.9 | 485.0 | 484.9 |
| Pe (%) | 22.4 | 21.9 | 18.2 | 17.6 | 16.4 | 14.3 | 15.3 |

Referring to Tables 1 and 2, the present invention provides a blue colored glass having a standard soda-lime-silica glass base composition and additionally iron and cobalt, and optionally selenium and titanium, as infrared and ultraviolet radiation absorbing materials and colorants, a luminous transmittance (LTA) of greater than 20% up to 60%, and a color characterized by a dominant wavelength (DW) in the range of 480 to 489 nanometers (nm), preferably 482 to 487 nm, and an excitation purity (Pe) of at least 8%, preferably 10 to 30% at a thickness of 0.16 inches (4.06 mm). It is anticipated that the color of the glass may vary within the dominant wavelength range to provide a desired product.

The redox ratio for the glass is maintained between 0.15 to 0.40, preferably between 0.20 to 0.35, more preferably between 0.24 to 0.32. The glass composition also has a TSUV of no greater than 35%, preferably no greater than 30%; a TSIR of no greater than 25%, preferably no greater than 20%; and a TSET of no greater than 40%, preferably no greater than 35%.

In one particular embodiment, the glass composition includes 0.9 to 2 wt % total iron, preferably 1 to 1.4 wt % total iron, and more preferably 1.1 to 1.3 wt % total iron; 0.15 to 0.65 wt % FeO, preferably 0.2 to 0.5 wt % FeO, and more preferably 0.24 to 0.40 wt % FeO; and 90 to 250 PPM CoO, preferably 100 to 150 PPM CoO, and more preferably 110 to 140 PPM CoO. As discussed earlier, selenium may also be included in the glass composition and more specifically, 0 to 12 PPM Se, preferably 0 to 8 PPM Se. One embodiment of the invention includes 1 to 6 PPM Se. Similarly, titanium may also be included in the glass composition, and more specifically, 0 to 0.9 wt % $TiO_2$, preferably, 0 to 0.5 wt % $TiO_2$. One embodiment of the invention includes 0.02 to 0.3 wt % $TiO_2$.

In one particular embodiment of the invention, the glass composition is selenium-free and has an LTA of greater than 20% up to 60%, and preferably greater than 35% up to 55%. In another embodiment of the invention, the glass composition is selenium-free and has less than 200 PPM CoO. In still another embodiment of the invention, the glass composition has up to 12 PPM Se and has an LTA of greater than 35% up to 60%, preferably 40 to 55%.

It is expected that the spectral properties of the glass will change after tempering the glass and further upon prolonged exposure to ultraviolet radiation, commonly referred to as "solarization". In particular, it is estimated that tempering and solarization of the glass compositions disclosed herein may reduce the LTA and TSIR by about 0.5 to 1%, reduce the TSUV by about 1 to 2%, and the TSET by about 1 to 1.5%. As a result, in one embodiment of the invention, the glass has selected spectral properties that initially fall outside the desired ranges previously discussed but fall within the desired ranges after tempering and/or solarization.

Glass as disclosed herein and made by the float process typically ranges from a sheet thickness of about 1 millimeter to 10 millimeters.

For vehicle glazing applications, it is preferred that the glass sheets having a composition and spectral properties as disclosed herein have a thickness within the range of 0.121 to 0.197 inches (3.1 to 5 mm). It is anticipated that when using a single glass ply in the above thickness range, the glass will be tempered, e.g. for an automotive side or rear window.

It is also contemplated that the glass will have architectural applications and be used at thicknesses ranging from about 0.14 to 0.24 inches (3.6 to 6 mm).

When multiple plies are used for either automotive or architectural applications, it is anticipated that the glass plies will be annealed and laminated together using a thermoplastic adhesive, such as polyvinyl butyral.

As discussed earlier, other materials may also be added to the glass compositions disclosed herein to further reduce infrared and ultraviolet radiation transmission and/or control glass color. In particular, it is contemplated that the following materials may be added to the iron and cobalt, and optionally selenium and/or titanium containing soda-lime-silica glass disclosed herein:

| | |
|---|---|
| $Nd_2O_3$ | 0 to 1 wt % |
| $SnO_2$ | 0 to 2 wt % |
| ZnO | 0 to 1 wt % |
| $MoO_3$ | 0 to 0.03 wt % |
| $CeO_2$ | 0 to 2 wt % |
| NiO | 0 to 0.1 wt % |

As should be appreciated, adjustments may have to be made to the basic iron, cobalt, selenium and titanium constituents to account for any coloring and/or redox affecting power of these additional materials.

Other variations as are known to those skilled in the art may be resorted to without departing from the scope of the invention as defined by the claims that follow.

We claim:

1. A blue colored, infrared and ultraviolet radiation absorbing glass composition having a composition comprising a base glass portion comprising:

| | |
|---|---|
| $SiO_2$ | 66 to 75 percent by weight, |
| $Na_2O$ | 10 to 20 percent by weight, |
| CaO | 5 to 15 percent by weight, |
| MgO | 0 to 5 percent by weight, |
| $Al_2O$ | 0 to 5 percent by weight, |
| $K_2O$ | 0 to 5 percent by weight, | and a solar radiation absorbing and colorant portion consisting essentially of:

| | |
|---|---|
| total iron | 1 to 2 percent by weight, |
| FeO | 0.15 to 0.65 percent by weight, |
| CoO | 90 to 250 PPM, |
| $TiO_2$ | 0 to 0.9 percent by weight, and |
| $MnO_2$ | up to about 39 ppm, | the glass having a luminous transmittance (LTA) of greater than 20% up to 60%, and a color characterized by a dominant wavelength in the range of 480 to 489 nanometers and an excitation purity of at least 8%, a total solar ultraviolet transmittance (TSUV) of 35 percent or less and a total solar infrared transmittance (TSIR) of 25 percent or less where all of these are determined for a thickness of 0.160 inches.

2. The composition as in claim 1 wherein the total iron concentration is from 1 to 1.4 weight percent, the FeO concentration is 0.20 to 0.50 weight percent, the CoO concentration is 100 to 150 PPM, and the $TiO_2$ concentration is 0 to 0.5 weight percent.

3. The composition as in claim 2 wherein the composition has a redox of 0.20 to 0.35.

4. A blue colored, infrared and ultraviolet radiation absorbing glass composition having a composition comprising a base glass portion comprising:

| | |
|---|---|
| $SiO_2$ | 66 to 75 percent by weight, |
| $Na_2O$ | 10 to 20 percent by weight, |
| CaO | 5 to 15 percent by weight, |
| MgO | 0 to 5 percent by weight, |
| $Al_2O$ | 0 to 5 percent by weight, |
| $K_2O$ | 0 to 5 percent by weight, | and a solar radiation absorbing and colorant portion consisting essentially of:

| | |
|---|---|
| total iron | 1.1 to 1.3 percent by weight |
| FeO | 0.24 to 0.40 percent by weight |
| CoO | 110 to 140 PPM, |
| $TiO_2$ | 0 to 0.9 percent by weight |
| $MnO_2$ | up to 39 ppm. | the glass having a luminous transmittance (LTA) of greater than 20% up to 60%, and a color characterized by a dominant wavelength in the range of 480 to 489 nanometers and an excitation purity of at least 8%, a total solar ultraviolet transmittance (TSUV) of 35 percent or less where all of these are determined for a thickness of 0.160 inches.

5. The composition as in claim 4 wherein the $TiO_2$ concentration is 0.02 to 0.40 weight percent.

6. The composition as in claim 4 wherein the glass has a total solar infrared transmittance (TSIR) of 25 percent or less and a total solar energy (TSET) transmittance of 40 percent or less, and the color of the glass is characterized by a dominant wavelength in the range of 482 to 487 nanometers and an excitation purity of 10 to 30 percent, where all of these are determined for a thickness of 0.160 inches.

7. The composition as in claim 6 wherein the glass has a total solar ultraviolet transmittance (TSUV) of 30 percent or less, a total solar infrared transmittance (TSIR) of 20 percent or less and a total solar energy transmittance (TSET) of 35 percent or less where all of these are determined for a thickness of 0.160 inches.

8. The composition as in claim 6 wherein the glass has a luminous transmittance (LTA) of greater than 35 up to 55 percent.

9. The composition as in claim 1 wherein the glass has a total solar ultraviolet transmittance (TSUV) of 35 percent or less, a total solar infrared transmittance (TSIR) of 25 percent or less and a total solar energy transmittance (TSET) of 40 percent or less, where all of these are determined for a thickness of 0.160 inches.

10. The composition as in claim 1 wherein the glass has a luminous transmittance (LTA) of greater than 35 up to 55 percent.

11. The composition as in claim 1 wherein the color of the glass is characterized by a dominant wavelength in the range of 482 to 489 nanometers and an excitation purity of 10 to 30 percent.

12. The composition as in claim 1 wherein the composition has a redox of 0.15 to 0.40.

13. A flat glass sheet made by a float process from the glass composition recited in claim 1.

14. An automotive window formed from the flat glass sheet of claim 13.

15. A blue colored, infrared and ultraviolet radiation absorbing glass composition having a composition comprising a base glass portion comprising:

| | |
|---|---|
| $SiO_2$ | 66 to 75 percent by weight, |
| $Na_2O$ | 10 to 20 percent by weight, |
| CaO | 5 to 15 percent by weight, |
| MgO | 0 to 5 percent by weight, |
| $Al_2O$ | 0 to 5 percent by weight, |
| $K_2O$ | 0 to 5 percent by weight, | and a solar radiation absorbing and colorant portion consisting essentially of:

| | | |
|---|---|---|
| total iron | 1 to 2 | percent by weight |
| FeO | 0.15 to 0.65 | percent by weight |
| CoO | 90 to less than 200 | PPM, |
| $TiO_2$ | 0 to 0.9 | percent by weight, and |
| $MnO_2$ | up to about 39 | ppm, | the glass having a luminous transmittance (LTA) of up to 60 percent, and the color of the glass characterized by a dominant wavelength in the range of 480 to 489 nanometers and an excitation purity of at least 8 percent and a total solar ultraviolet transmittance (TSUV) of 35 percent or less, and a total solar infrared transmittance (TSIR) of 25 percent or less, where all of these are determined for a thickness of 0.160 inches.

16. The composition as in claim 15 wherein the glass has a luminous transmittance (LTA) of greater than 20 percent up to 55 percent, and a total solar energy (TSET) transmittance of 40 percent or less, and the color of the glass is characterized by a dominant wavelength in the range of 482 to 489 nanometers and an excitation purity of 10 to 30 percent, where all of these are determined for a thickness of 0.160 inches.

17. A blue colored, infrared and ultraviolet radiation absorbing glass composition having a composition comprising a base glass portion comprising:

| | |
|---|---|
| $SiO_2$ | 66 to 75 percent by weight, |
| $Na_2O$ | 10 to 20 percent by weight, |
| CaO | 5 to 15 percent by weight, |
| MgO | 0 to 5 percent by weight, |
| $Al_2O$ | 0 to 5 percent by weight, |
| $K_2O$ | 0 to 5 percent by weight, | and a solar radiation absorbing and colorant portion consisting essentially of:

| | | |
|---|---|---|
| total iron | 1 to 2 | percent by weight |
| FeO | 0.15 to 0.65 | percent by weight |
| CoO | 90 to 250 | PPM, |
| Se | 0 to 12 | PPM, |
| $TiO_2$ | 0 to 0.9 | percent by weight and |
| $MnO_2$ | up to about 39 | ppm, | the glass having a luminous transmittance (LTA) of greater than 35% up to 60 percent, and the color of the glass characterized by a dominant wavelength in the range of 480 to 489 nanometers and an excitation purity of at least 8 percent and a total solar ultraviolet transmittance (TSUV) of 35 percent or less, and a total solar infrared transmittance (TSIR) of 25 percent or less, where all of these are determined for a thickness of 0.160 inches.

18. The composition as in claim 17 wherein the total iron concentration is from 1 to 1.4 weight percent, the FeO concentration is 0.20 to 0.50 weight percent, the CoO concentration is 100 to 150 PPM, the Se concentration is 0 to 8 PPM, and the $TiO_2$ concentration is 0 to 0.5 weight percent.

19. The composition as in claim 18 wherein the composition has a redox of 0.20 to 0.35.

20. A blue colored, infrared and ultraviolet radiation absorbing glass composition having a composition comprising a base glass portion comprising:

| | |
|---|---|
| $SiO_2$ | 66 to 75 percent by weight, |
| $Na_2O$ | 10 to 20 percent by weight, |
| CaO | 5 to 15 percent by weight, |
| MgO | 0 to 5 percent by weight, |
| $Al_2O$ | 0 to 5 percent by weight, |
| $K_2O$ | 0 to 5 percent by weight, | and a solar radiation absorbing and colorant portion consisting essentially of:

| | | |
|---|---|---|
| total iron | 1.1 to 1.3 | percent by weight, |
| FeO | 0.24 to 0.40 | percent by weight, |
| CoO | 110 to 140 | PPM, |
| Se | 1 to 6 | PPM, |
| $TiO_2$ | 0 to 0.5 | percent by weight, and |
| $MnO_2$ | up to about 39 | ppm, | the glass having a luminous transmittance (LTA) of greater than 35% up to 60 percent, and the color of the glass characterized by a dominant wavelength in the range of 480 to 489 nanometers and an excitation purity of at least 8 percent, where all of these are determined for a thickness of 0.160 inches.

21. The composition as in claim 4 wherein the glass has a luminous transmittance (LTA) of 40 to 55 percent.

22. The composition as in claim 17 wherein the glass has a total solar energy transmittance (TSET) of 40 percent or less at a thickness of 0.160 inches.

23. The composition as in claim 17 wherein the glass has a luminous transmittance (LTA) of 40 to 55 percent.

24. The composition as in claim 17 wherein the color of the glass is characterized by a dominant wavelength in the range of 482 to 489 nanometers and an excitation purity of 10 to 30 percent.

25. The composition as in claim 17 wherein the composition has a redox of 0.15 to 0.40.

26. A flat glass sheet made by a float process from the glass composition recited in claim 17.

27. An automotive window formed from the flat glass sheet of claim 26.

28. The blue colored, infrared and ultraviolet radiation absorbing glass composition having a comprising a base glass portion comprising:

| | |
|---|---|
| SiO$_2$ | 66 to 75 percent by weight, |
| Na$_2$O | 10 to 20 percent by weight, |
| CaO | 5 to 15 percent by weight, |
| MgO | 0 to 5 percent by weight, |
| Al$_2$O | 0 to 5 percent by weight, |
| K$_2$O | 0 to 5 percent by weight, | and a solar radiation absorbing and colorant portion consisting essentially of:

| | |
|---|---|
| total iron | 1 to 2 percent by weight, |
| FeO | 0.15 to 0.65 percent by weight |
| CoO | 90 to 250 PPM, |
| Se | 0 to 12 PPM |
| TiO$_2$ | 0 to 0.9 percent by weight, |
| Nd$_2$O$_3$ | 0 to 1 percent by weight, |
| SnO$_2$ | 0 to 2 percent by weight, |
| ZnO | 0 to 1 percent by weight, |
| MoO$_3$ | 0 to 0.03 percent by weight, |
| CeO$_2$ | 0 to 2 percent by weight, |
| NiO | 0 to 0.1 percent by weight, |
| MnO$_2$ | up to about 39 ppm, and |
| SO$_3$ | up to about 0.3 weight percent | the glass having a luminous transmittance (LTA) of greater than 35 percent up to 60 percent, and the color of the glass characterized by a dominant wavelength in the range of 480 to 489 nanometers and an excitation purity of at least 8 percent and a total solar ultraviolet transmittance (TSUV) of 35 percent or less, and a total solar infrared transmittance (TSIR) of 25 percent or less, where all of these are determined for a thickness of 0.160 inches.

29. The composition as in claim 28 wherein the glass has a total solar infrared transmittance (TSIR) of 25 percent or less and a total solar energy transmittance (TSET) of 40 percent or less, where all of these are determined for a thickness of 0.160 inches.

30. The composition as in claim 29 wherein the color of the glass is characterized by a dominant wavelength in the range of 482 to 487 nanometers and an excitation purity of 10 to 30 percent, where all of these are determined for a thickness of 0.160 inches.

31. The composition as in claim 30 wherein the total iron concentration is from 1.0 to 1.4 weight percent, the FeO concentration is 0.2 to 0.5 weight percent, the CoO concentration is 100 to 150 PPM, the Se concentration is 0 to 8 PPM, and the TiO$_2$ concentration is 0 to 0.50 weight percent.

32. A flat glass sheet made by a float process from the glass composition recited in claim 31.

33. The composition as in claim 1, which includes up to about 0.3 weight percent SO$_3$.

34. The composition as in claim 1, which includes melting and refining aids, tramp materials or impurities.

35. A blue colored, infrared and ultraviolet radiation absorbing glass composition having a composition comprising a base glass portion comprising:

| | |
|---|---|
| SiO$_2$ | 66 to 75 percent by weight, |
| Na$_2$O | 10 to 20 percent by weight, |
| CaO | 5 to 15 percent by weight, |
| MgO | 0 to 5 percent by weight, |
| Al$_2$O | 0 to 5 percent by weight, |
| K$_2$O | 0 to 5 percent by weight, | and a solar radiation absorbing and colorant portion consisting essentially of:

| | |
|---|---|
| total iron | 0.9 to 2 percent by weight |
| FeO | 0.15 to 0.65 percent by weight |
| CoO | 110 to 250 PPM, |
| TiO$_2$ | 0 to 0.9 percent by weight, and |
| MnO$_2$ | up to about 39 ppm, | the glass having a luminous transmittance (LTA) of greater than 20% up to 60%, and a color characterized by a dominant wavelength in the range of 480 to 489 nanometers and an excitation purity of at least 8%, a total solar ultraviolet transmittance (TSUV) of 35 percent or less where all of these are determined for a thickness of 0.160 inches.

36. An uncoated blue colored, infrared and ultraviolet radiation absorbing float glass composition having a composition comprising a base glass portion comprising:

| | |
|---|---|
| SiO$_2$ | 66 to 75 percent by weight, |
| Na$_2$O | 10 to 20 percent by weight, |
| CaO | 5 to 15 percent by weight, |
| MgO | 0 to 5 percent by weight, |
| Al$_2$O | 0 to 5 percent by weight, |
| K$_2$O | 0 to 5 percent by weight, | and a solar radiation absorbing and colorant portion consisting essentially of:

| | |
|---|---|
| total iron | 0.9 to 2 percent by weight, |
| FeO | 0.15 to 0.65 percent by weight, |
| CoO | 90 to 250 PPM, |
| Se | 0 to 12 PPM |
| TiO$_2$ | 0 to 0.9 percent by weight, and |
| MnO$_2$ | up to about 39 ppm |
| Nd$_2$O$_3$ | 0 to 1 percent by weight, |
| SnO$_2$ | 0 to 2 percent by weight, |
| ZnO | 0 to 1 percent by weight, |
| MoO$_3$ | 0 to 0.03 percent by weight, |
| CeO$_2$ | 0 to 2 percent by weight, |
| NiO | 0 to 0.1 percent by weight, and |
| SO$_3$ | up to about 0.3 weight percent; | the amounts of iron as ferric and ferrous oxides and the amounts of cobalt and optionally selenium, titanium, and manganese are such as to obtain the glass having a luminous transmittance (LTA) of greater than 20% up to 60%, and a color characterized by a dominant wavelength in the range of 480 to 489 nanometers and an excitation purity of at least 8%, a total solar ultraviolet transmittance (TSUV) of 35 percent or less and a total solar infrared transmittance (TSIR) of 25 percent or less where all of these are determined for a thickness of 0.160 inches.

37. The composition as in claim 1 that is selenium-free and has an LTA of greater than 20% up to 60% and has less than 200 PPM CoO.

38. The composition as in claim 35 that has a total solar infrared transmittance (TSIR) of 25 percent or less where all of these are determined for a thickness of 0.160 inches.

39. The composition as in claim 35 wherein the glass has a luminous transmittance (LTA) of greater than 20 percent up to 55 percent, and a total solar energy (TSET) transmittance of 40 percent or less, and the color of the glass is characterized by a dominant wavelength in the range of 482 to 489 nanometers and an excitation purity of 10 to 30 percent, where all of these are determined for a thickness of 0.160 inches.

40. The composition as in claim 35 wherein the total iron concentration is from 1 to 1.4 weight percent, the FeO concentration is 0.20 to 0.50 weight percent, the CoO concentration is 110 to 150 PPM, and the $TiO_2$ concentration is 0 to 0.5 weight percent.

41. The composition as in claim 35 wherein the composition has a redox of 0.20 to 0.35.

42. The composition as in claim 35 wherein the $TiO_2$ concentration is from 0.02 to 0.40 weight percent.

43. The composition as in claim 35 wherein the glass has a luminous transmittance (LTA) of 40 to 55 percent.

44. The composition as in claim 35 wherein the glass has a total solar energy transmittance (TSET) of 40 percent or less at a thickness of 0.160 inches.

45. The composition as in claim 35 wherein the composition has a redox of 0.15 to 0.40.

46. The composition as in claim 35, which includes up to about 0.3 weight percent $SO_3$.

47. The composition as in claim 35 which includes melting and refining aids, tramp materials or impurities.

48. A flat glass sheet made a float process from the glass composition recited in claim 35.

49. An automotive window formed from the flat glass sheet of claim 48.

50. The composition as in claim 36, wherein the excitation purity is in the range of 15.3 to 30 percent.

* * * * *